(12) United States Patent
Balyan et al.

(10) Patent No.: US 8,155,128 B2
(45) Date of Patent: Apr. 10, 2012

(54) METHOD AND APPARATUS FOR ESTABLISHING AND MANAGING DIAMETER ASSOCIATIONS

(75) Inventors: Avneesh Singh Balyan, Columbus, OH (US); Randy J. Paul, Lancaster, OH (US); Satish Polakampalli, Blacklick, OH (US); Khalid H. Sheta, Columbus, OH (US); Pranil P. Vaidya, Aurora, IL (US)

(73) Assignee: Alcatel Lucent, Paris (FR)

( * ) Notice: Subject to any disclaimer, the term of this patent is extended or adjusted under 35 U.S.C. 154(b) by 663 days.

(21) Appl. No.: 11/861,887

(22) Filed: Sep. 26, 2007

(65) Prior Publication Data

US 2009/0080440 A1    Mar. 26, 2009

(51) Int. Cl.
*H04L 12/28* (2006.01)
(52) U.S. Cl. ......... 370/400; 370/389; 370/396; 370/401
(58) Field of Classification Search .................. 370/328, 370/352, 400, 401, 356; 455/410, 411, 422.1
See application file for complete search history.

(56) References Cited

U.S. PATENT DOCUMENTS

| | | | | |
|---|---|---|---|---|
| 5,680,437 | A * | 10/1997 | Segal | 379/15.01 |
| 6,618,369 | B1 * | 9/2003 | Huh et al. | 370/352 |
| 2003/0217285 | A1 * | 11/2003 | Sanchez et al. | 713/200 |
| 2004/0022237 | A1 * | 2/2004 | Elliott et al. | 370/356 |
| 2006/0031520 | A1 * | 2/2006 | Bedekar et al. | 709/227 |
| 2006/0045249 | A1 * | 3/2006 | Li et al. | 379/126 |
| 2007/0165622 | A1 * | 7/2007 | O'Rourke et al. | 370/389 |
| 2008/0127232 | A1 * | 5/2008 | Langen et al. | 719/328 |

OTHER PUBLICATIONS

International Search Report and Written Opinion dated May 29, 2009 in PCT/US2008/010858, Lucent Technologies Inc., Applicant, 17 pages.

Calhoun Airespace P et al: "Diameter Base Protocol; rfc3588.txt" IETF Standard, Internet Engineering Task Force, IETF, CH, Sep. 1, 2003, XP015009370 ISSN: 0000-0003 abstract p. 17, paragraph 5-p. 18 paragraph 5; p. 25, paragraph 7-p. 29, paragraph 4.

"3rd Generation Partnership Project; Technical Specification Group Core Network; IP Multimedia (IM) Subsystem Cx and Dx Interfaces; Signalling flows and message contents; (Release 5)" 3GPP Draft; 29228-121, 3RD Generation Partnership Project 93GPP0, Mobile Competence Centre; 650, Route Des Lucioles; F-06921 Sophia-Antipolis Cedex; France, no. Budapest; 20020513, Apr. 28, 2002, XP050080500 the whole document.

(Continued)

*Primary Examiner* — Hassan Phillips
*Assistant Examiner* — Anez Ebrahim
(74) *Attorney, Agent, or Firm* — Wall & Tong, LLP

(57) ABSTRACT

The invention includes a method and apparatus for establishing DIAMETER associations between nodes of a network. The invention uses a DIAMETER application server disposed between DIAMETER nodes in order to establish DIAMETER associations between nodes and, further, to provide DIAMETER traffic load balancing using established associations. A method includes receiving a DIAMETER connection establishment request from an originating node requesting an association with a destination node, terminating the DIAMETER connection establishment request, obtaining respective DIAMETER associations for the originating node and the destination node, linking the obtained DIAMETER associations, and storing the linked DIAMETER associations. The DIAMETER association for a node may be obtained by identifying a node associated with the DIAMETER connection establishment request, determining if an association exists for the identified node, and retrieving the association from memory if an association exists for the identified node, retrieving the association from memory, or, if an association does not exist for the identified node, establishing the association.

20 Claims, 7 Drawing Sheets

OTHER PUBLICATIONS

"$3^{rd}$ Generation Partnership Project; Technical Specification Group Core Network; Cx and Dx Interfaces based on the Diameter protocol; Protocol details; (Release 5)" 3GPP Draft; NP-020265, $3^{RD}$ Generation Partnership Project 93GPP0, Mobile Competence Centre; 650, Route Des Lucioles; F-06921 Sophia-Antipolis Cedex; France, vol. TSG CN, no. Marco Island; 20020605, May 30, 2002, XP050052551, the whole document.

"$3^{rd}$ Generation Partnership Project; Technical Specification Group Core Network; Sh Interface based on the Diameter protocol; Protocol details; (Release 5)" 3GPP Draft; 29329-201, $3^{RD}$ Generation Partnership Project 9EGPPO, Mobile Competence Centre; 650, Route Des Lucioles; F-06921 Sophia-antipolis Cedex; France, vol. TSG CN, no. Budapest Hungary; 20020513, May 27, 2002 XP050053025 the whole document.

* cited by examiner

METHOD AND APPARATUS FOR ESTABLISHING AND MANAGING DIAMETER ASSOCIATIONS

FIELD OF THE INVENTION

The invention relates to the field of communication networks and, more specifically, to Authentication, Authorization, and Accounting (AAA) protocols.

BACKGROUND OF THE INVENTION

The DIAMETER protocol is a computer networking protocol for providing Authentication, Authorization, and Accounting (AAA) functions. The DIAMETER protocol utilizes Query-Response transactions to perform AAA functions. The DIAMETER protocol expects an end-to-end tunnel association to be set up between an originating network element (NE) and a destination network element (NE) before any Query-Response transaction is initiated. Disadvantageously, a unique DIAMETER association must be created for each pair of originating NEs and destination NEs and, further, the created DIAMETER associations must be maintained for the lifetime of network call processing. Furthermore, if multiple originating NEs or multiple destination NEs are created (e.g., for load sharing and/or reliability purposes), where the multiple NEs share identical attributes (e.g., logical entity, IP address, port numbers, and the like), maintaining such DIAMETER associations between originating NE and destination NE pairs becomes even more cumbersome, and, thus, inefficient from a call processing perspective. Moreover, maintaining such DIAMETER associations, especially redundant DIAMETER associations, produce significant memory usage overhead and CPU usage overhead on every DIAMETER NE.

SUMMARY OF THE INVENTION

Various deficiencies in the prior art are addressed through the invention of a method and apparatus for establishing DIAMETER associations between nodes of a network. The invention uses a DIAMETER application server disposed between DIAMETER nodes in order to establish DIAMETER associations between nodes and, further, to provide DIAMETER traffic load balancing using established associations.

A method includes receiving a DIAMETER connection establishment request from an originating node requesting an association with a destination node, terminating the DIAMETER connection establishment request, obtaining respective DIAMETER associations for the originating node and the destination node, linking the obtained DIAMETER associations, and storing the linked DIAMETER associations.

The DIAMETER association for a node may be obtained by identifying a node associated with the DIAMETER connection establishment request, determining if an association exists for the identified node, and retrieving the association from memory if an association exists for the identified node, retrieving the association from memory, or, if an association does not exist for the identified node, establishing the association.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides DIAMETER association load balancing functions. The present invention utilizes a DIAMETER application server to provide improved establishment and management of DIAMETER associations between originating nodes and destination nodes, thereby enabling improved DIAMETER traffic load balancing. The present invention drastically simplifies addition of nodes to DIAMETER signaling networks and removal of nodes from DIAMETER signaling networks. Although primarily depicted and described herein with respect to a specific AAA signaling protocol (namely, the DIAMETER signaling protocol), the present invention is applicable to other AAA signaling protocols, and, further, is applicable to other non-AAA signaling protocols.

Figure 1:
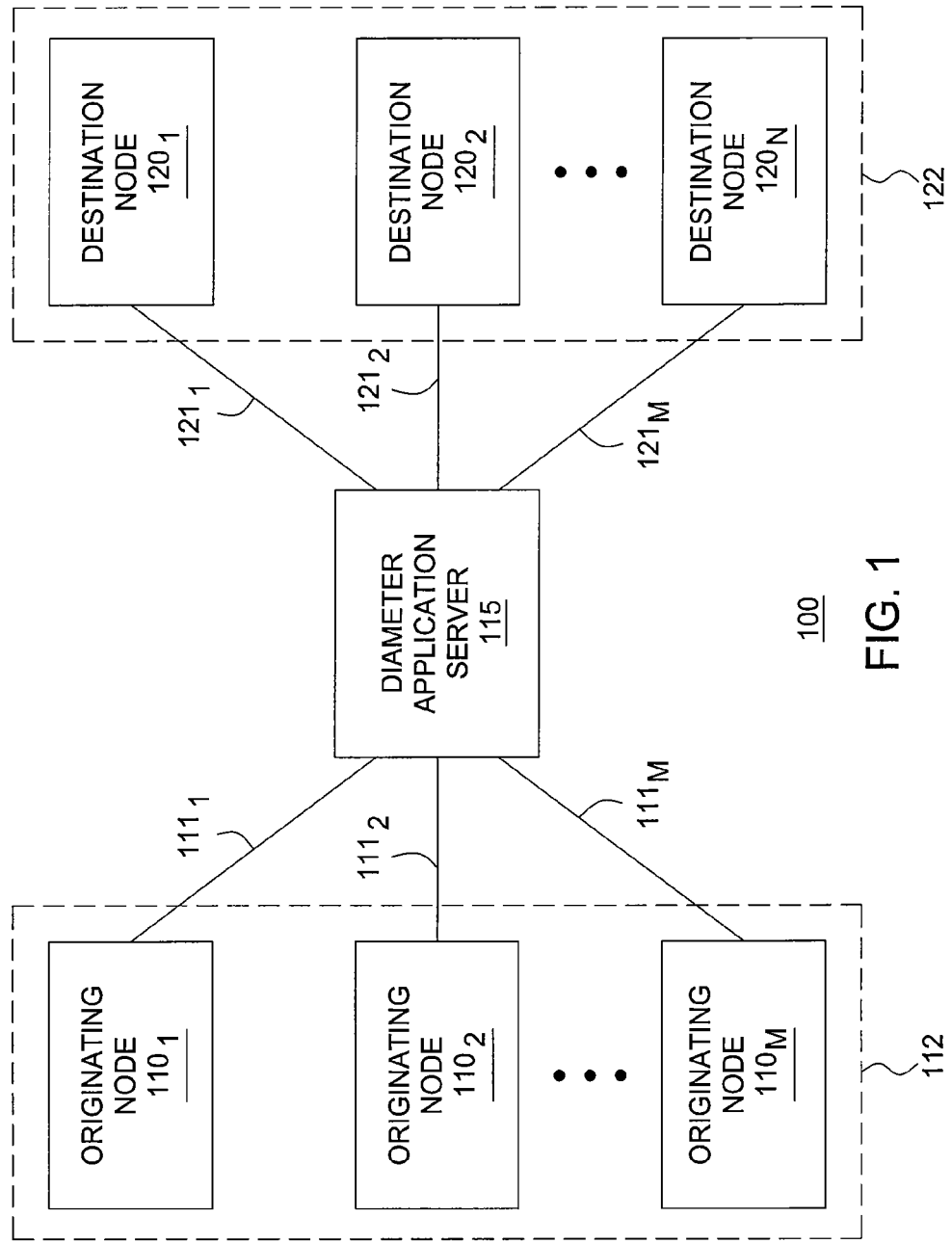
FIG. 1 depicts a high-level block diagram of a communication network.

FIG. 1 depicts a high-level block diagram of a communication network. Specifically, communication network 100 includes a DIAMETER Application Server (DAS) 115 facilitating DIAMETER-based communications between a plurality of originating nodes $110_1$-$110_M$ (collectively, originating nodes 110) and a plurality of destination nodes $120_1$-$120_N$ (collectively, destination nodes 120). The originating nodes 110 communicate with DAS 115 using a plurality of originating DIAMETER links $111_1$-$111_M$ (collectively, originating DIAMETER links 111), respectively. The destination nodes 120 communicate with DAS 115 using a plurality of destination DIAMETER links $121_1$-$121_M$ (collectively, destination DIAMETER links 121), respectively. Thus, communication network 100 functions as a DIAMETER-based signaling network.

As depicted in FIG. 1, the DIAMETER-based signaling network facilitates DIAMETER-based signaling between originating nodes 110 and destination nodes 120. The originating nodes 110 and destination nodes 120 include any network elements which may communicate using the DIAMETER protocol. For example, where DIAMETER-based signaling network 100 is implemented within an IP Multimedia Subsystem (IMS) network, originating nodes 110 and destination nodes 120 may include network elements such as Call Session Control Functions (CSCFs, such as proxy-CSCFs, serving-CSCFs, and the like), Home Subscriber Servers (HSSs), Application Servers (ASs), and the like, as well as various combinations thereof. The DIAMETER-based signaling network may be implemented as part of any communication network using DIAMETER signaling.

In one embodiment, one logical node may be implemented using multiple physical nodes (e.g., for load balancing purposes, reliability purposes, and the like, as well as various combinations thereof). In one such embodiment, originating nodes 110 comprise respective physical instances of a logical originating node 112 (and, thus, are denoted as physical originating nodes 110) and destination nodes 120 comprise respective physical instances of a logical destination node 122 (and, thus, are denoted as physical destination nodes 120). For example, in an IMS network, logical originating node 112 may be an HSS implemented as multiple physical HSSs (e.g., one logical HSS entity implemented as 200 physical HSSs). Similarly, for example, in an IMS network, logical destination node 122 may be a S-CSCF implemented as multiple physical S-CSCFs (e.g., one logical S-CSCF entity implemented as 10 physical S-CSCFs).

In an embodiment in which multiple physical nodes comprise different instances of one logical node, the multiple physical nodes which form a logical node may have some associated attributes that are identical for each of the physical nodes and other associated attributes that are different for each of the physical nodes. For example, the different physical nodes that make up a logical node may have identical logical entity identifiers, domain names (e.g., Fully Qualified Domain Name (FQDN)), port numbers, and like attributes. For example, the different physical nodes that make up a logical node may have different IP addresses and like attributes. Thus, DAS 115 can identify physical nodes that are different instances of the same logical node while at the same time distinguishing between logical nodes.

In one embodiment, for example, where an IMS network supports a large number of subscribers, some or all of the components of the IMS network may be implemented as multiple physical instances. For example, the HSS of an IMS network may be implemented using multiple physical HSS elements. For example, where an IMS network is required to support 50 million customers, the HSS may be implemented using 1000 different physical HSS elements such that each physical HSS element is only required to support approximately 50,000 customers. For example, the S-CSCF of an IMS network may be implemented using multiple physical S-CSCF elements. For example, where an IMS network is required to support 50 million customers, the S-CSCF may be implemented using 100 different physical S-CSCF elements such that each physical S-CSCF element is only required to support approximately 500,000 customers.

As depicted in FIG. 1, DAS 115 is disposed between physical originating nodes 110 and physical destination nodes 120, operating as a Signaling Transfer Point (STP) of the DIAMETER-based signaling network. The DAS 115 operates as a single DIAMETER endpoint device for each of the physical originating nodes 110 (i.e., from the perspective of each of the physical originating nodes 110, DAS 115 is the destination for DIAMETER transactions transmitted from the physical originating nodes 110), thereby hiding the physical destination nodes 120 from each of the physical originating nodes 110. The DAS 115 operates as a single DIAMETER endpoint device for each of the physical destination nodes 120 (i.e., from the perspective of each of the physical destination nodes 110, DAS 115 is the source of DIAMETER transactions received at the physical destination nodes 120), thereby hiding the physical originating nodes 110 from each of the physical destination nodes 120.

The DAS 115 supports various DIAMETER networking capabilities. The DAS 115 operates at the DIAMETER application layer, rather than at transport layers, such as the TCP/IP transport layer, the SCTP/IP transport layer, and the like. The DAS 115 supports establishment of DIAMETER associations between physical originating nodes 110 and physical destination nodes 120. The DAS 115 monitors the health of DIAMETER connections, including originating DIAMETER links 111 to physical originating nodes 110 and destination DIAMETER links 121 to physical destination nodes 120, updating the status of DIAMETER associations as the health of the corresponding DIAMETER connections changes. The DAS 115 may also update DIAMETER associations as the network topology changes (e.g., as physical instances of logical nodes are added to the network or removed from the network, or as configurations of such logical nodes change).

The DAS 115 provides DIAMETER traffic switching capabilities for switching DIAMETER-based traffic between physical originating nodes 110 and physical destination nodes 120 using established associations between physical originating nodes 110 and physical destination nodes 120. The DAS 115 supports DIAMETER-based traffic load balancing. The DAS 115 supports balancing of DIAMETER signaling traffic across multiple physical instances of a logical node (i.e., load balancing DIAMETER traffic across each of the physical originating nodes 110 which are instances of the same logical node and, similarly, load balancing DIAMETER traffic across each of the physical destination nodes 120 which are instances of the same logical node). Further, DAS 115 may support load balancing of DIAMETER traffic across multiple logical nodes (which may be better understood with respect to FIG. 6).

The DAS 115 may be implemented at different locations of the communication network. In one embodiment, DAS 115 may be implemented as a DIAMETER application layer router/bridge. In one embodiment, DAS 115 may be implemented in the middle of the network. In one embodiment, for example, where DAS 115 is implemented within an IMS network, DAS 115 may be implemented at one or more of the defined interfaces of the IMS network. In one embodiment, for example, DAS 115 may be implemented as part of the Cx interface supporting DIAMETER communications between the I-CSCF/S-CSCF and the HSS. In one embodiment, for example, DAS 115 may be implemented as part of the Sh interface supporting DIAMETER communications between the ASs and the HSS.

Figure 2:
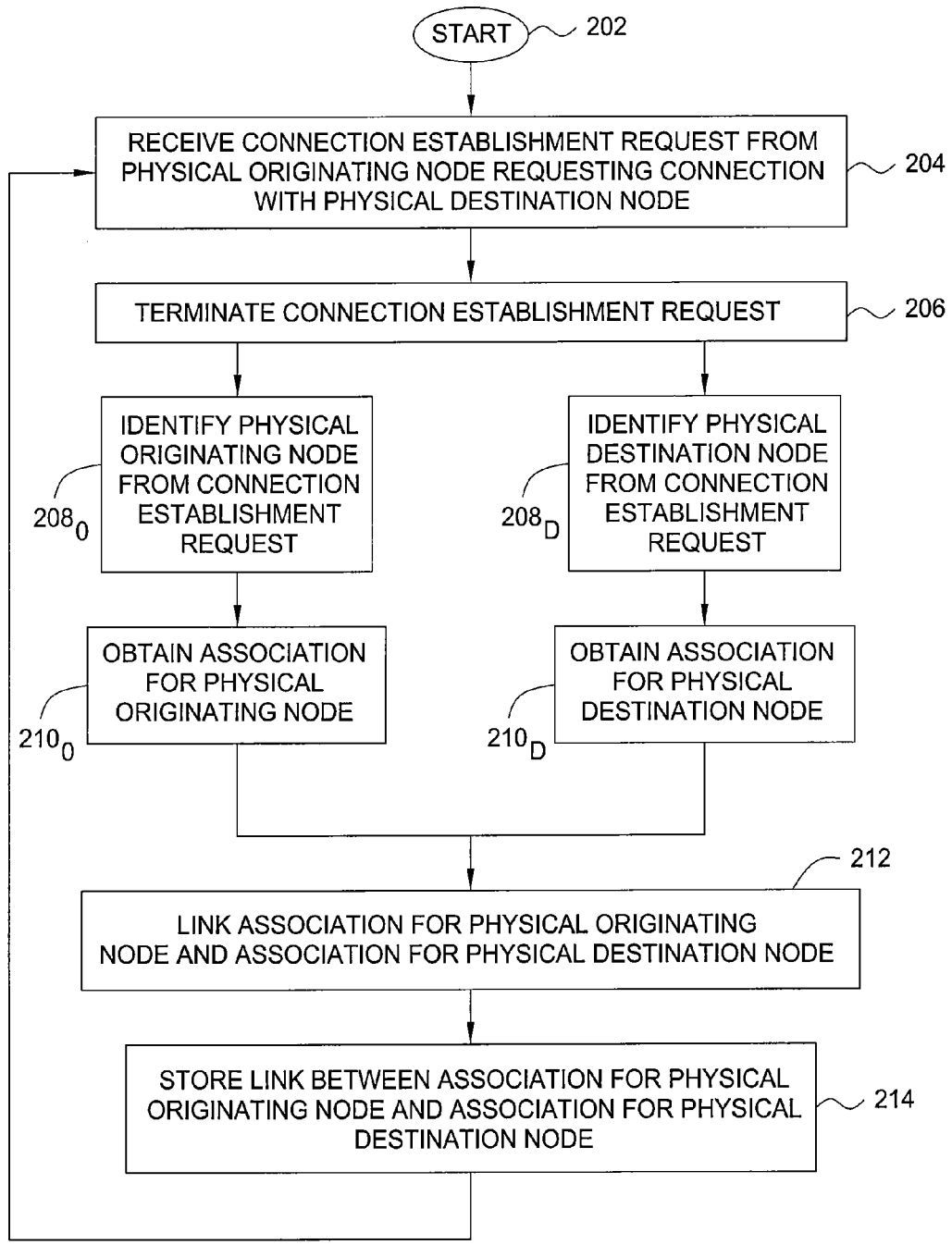
FIG. 2 depicts a method according to one embodiment of the present invention.

FIG. 2 depicts a method according to one embodiment of the present invention. Specifically, method 200 of FIG. 2 includes a method for establishing a DIAMETER association between ones of a plurality of physical originating NEs of a logical network entity and ones of a plurality of physical destination NEs of a logical network entity. Although depicted and described as being performed serially, at least a portion of the steps of method 200 of FIG. 2 may be performed contemporaneously, or in a different order than depicted and described with respect to FIG. 2. The method 200 begins at step 202 and proceeds to step 204.

At step 204, a connection establishment request is received. The connection establishment request is received from a physical originating node and intended for a physical destination node. The connection establishment request is a request to establish a DIAMETER association between the physical originating node and the physical destination node. The connection establishment request is received at a DIAMETER application server. At step 206, the connection establishment request is terminated (i.e., the DIAMETER application server does not just forward the connection establishment request to the physical destination node identified in the connection establishment request; rather, the DIAMETER application server performs processing adapted to improve the creation of DIAMETER associations between logical originating nodes and logical destination nodes).

At step 208, the physical origination node and the physical destination node are identified from the connection establishment request. As depicted in FIG. 2, identification of the physical nodes of the connection establishment request may be performed as one step (denoted as step 208, which may be performed serially or contemporaneously) or as individual steps (denoted as step $208_O$ for identification of the physical originating node and denoted as $208_D$ for identification of the physical destination node). The physical nodes of the connection establishment request may be identified from one or more fields of the connection establishment request (e.g., using one or more header fields of the connection establishment request).

At step 210, an association is obtained for the physical origination node and an association is obtained for the physical destination. As depicted in FIG. 2, obtaining the respective associations for the physical nodes of the connection establishment request may be performed as one step (denoted as step 210, which may be performed serially or contemporaneously) or as individual steps (denoted as step $210_O$ for obtaining the association for the physical originating node and denoted as $210_D$ for obtaining the association for the physical destination node). The associations for the respective physical nodes may be obtained in a number of ways. In one embodiment, the association for a physical node may be performed as depicted and described with respect to FIG. 3 (e.g., method 300 of FIG. 3 may be performed for the physical originating node and performed for the physical destination node).

At step 212, the obtained associations are linked. A link is created between the association obtained for the physical originating node and the association obtained for the physical destination node. The associations may be linked in a number of ways.

In one embodiment, links between associations of physical nodes may be maintained at the logical node level. In one such embodiment, for example, a link may be maintained for each combination of logical originating node and logical destination node, such that all existing associations of physical originating nodes of that logical originating node are linked to all existing associations of physical destination nodes of that logical destination node.

In one embodiment, links between associations of physical nodes may be maintained at the physical node level. In one such embodiment, for example, a link may be maintained for each physical node. For each physical originating node with an existing association, a list is maintained that identifies all associations of physical destination nodes. For each physical destination node with an existing association, a list is maintained that identifies all associations of physical originating nodes.

Although depicted and described with respect to specific embodiments for establishing and maintaining links between associations of physical nodes with the DIAMETER application server, links between associations of physical nodes with the DIAMETER application server may be established and maintained in various other ways.

At step 214, the link between the association obtained for the physical origination node and the association obtained for the physical destination node is stored. The link between the association obtained for the physical origination node and the association obtained for the physical destination node may be stored in a number of ways.

In one such embodiment, the link between the association obtained for the physical origination node and the association obtained for the physical destination node may be explicitly stored (e.g., using a link identifier, by storing pointers between associations in memory, and the like, as well as various combinations thereof).

In another such embodiment, the link between the association obtained for the physical origination node and the association obtained for the physical destination node may be implicitly stored. For example, the link may be implicitly created and stored by virtue of the manner in which the respective associations are stored.

As depicted in FIG. 2, from step 214, method 200 returns to step 204. In other words, the DIAMETER application server continues receiving and processing connection establishment requests in order to create associations between physical nodes and the DIAMETER application server, thereby improving the creation of DIAMETER associations between logical originating nodes and logical destination nodes.

Figure 3:
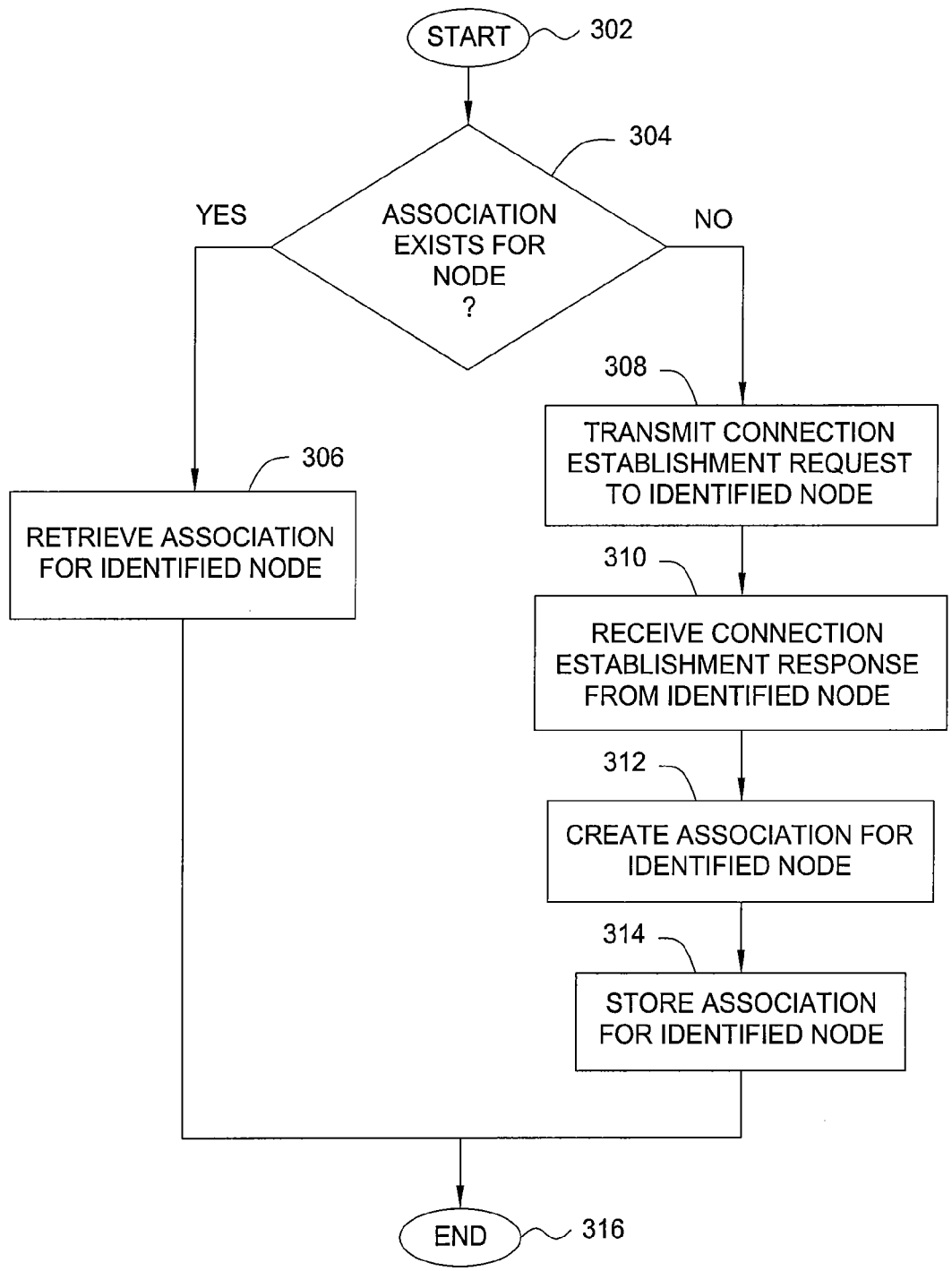
FIG. 3 depicts a method according to one embodiment of the present invention.

FIG. 3 depicts a method according to one embodiment of the present invention. Specifically, method 300 of FIG. 3 includes a method for obtaining an association for a physical node in response to a connection establishment request associated with the physical node. In one embodiment, method 300 of FIG. 3 may be performed as steps $210_O$ and $210_D$ of method 200 of FIG. 2. Although depicted and described as being performed serially, at least a portion of the steps of method 300 of FIG. 3 may be performed contemporaneously, or in a different order than depicted and described with respect to FIG. 3. The method 300 begins at step 302 and proceeds to step 304.

At step 304, a determination is made as to whether an association exists for a physical node (e.g., the physical node identified from a connection establishment request). The physical node may be a physical originating node or a physical destination node. The determination as to whether an association exists for a physical node may be determined by searching associations maintained at a DIAMETER application server (e.g., using one or more identifiers associated with the physical node). If an association does exist for the physical node, method 300 proceeds to step 306, at which point the association for the physical node is retrieved. If an association does not exist for the physical node, method 300 proceeds to steps 308-314, at which point the association for the physical node is generated.

At step 308, an association establishment request message is transmitted to the identified physical node. The association establishment request message is transmitted from the DIAMETER application server to the identified physical node. The association establishment request message is a request to establish a DIAMETER association between the identified physical node and the DIAMETER application server.

At step 310, an association establishment response message is received from the identified physical node. The association establishment response message is received at the DIAMETER application server from the identified physical node. The association establishment response message is a response to the request to establish a DIAMETER association between the identified physical node and the DIAMETER application server.

At step 312, an association is created for the identified physical node. The association is a DIAMETER association between the DIAMETER application server and the identified physical node. At step 314, the association for the identified physical node is stored. The information stored for an association may include any information related to the association (e.g., an association identifier that uniquely identifies the association between the physical node and the DIAM- ETER application server, the IP address of the physical node, port numbering information associated with the physical node, and the like, as well as various combinations thereof).

From steps 306 and 314, method 300 proceeds to step 316, where method 300 ends. Although depicted and described as ending, as described herein method 300 of FIG. 3 may be repeated twice for each connection establishment request received at the DIAMETER application server (i.e., a first time for the physical originating node identified in the DIAMETER connection establishment request message and a second time for the physical destination node identified in the DIAMETER connection establishment request message.

As depicted in FIG. 2 and FIG. 3, the DIAMETER association establishment method of the present invention significantly improves creation of DIAMETER associations (in terms of network resources consumed) between physical originating nodes and physical destination nodes by reusing existing associations, rather than generating new associations in response to every DIAMETER connection establishment request. The advantages of the DIAMETER association establishment method of the present invention may be better understood with respect to the following example.

For example, assume a logical CSCF is composed of ten physical CSCF nodes and a logical HSS is composed of fifty physical HSS nodes, and further assume that no associations exist for any of the CSCF nodes or HSS nodes.

In this example, assume that a first CSCF requests establishment of a DIAMETER association with a first HSS. Since no associations exist for the first CSCF or the first HSS, respective associations are created between the DIAMETER application server and the first CSCF and between the DIAMETER application server and the first HSS (e.g., using method 200 of FIG. 2, and using steps 304 and 308-314 of FIG. 3 for each of the first CSCF and the first HSS).

In this example, assume that a second CSCF requests establishment of a DIAMETER association with a second HSS. Since no associations exist for the second CSCF or the second HSS, respective associations are created between the DIAMETER application server and the second CSCF and between the DIAMETER application server and the second HSS (e.g., using method 200 of FIG. 2, and using steps 304 and 308-314 of FIG. 3 for each of the second CSCF and the second HSS).

In continuation of this example, assume that the first CSCF requests establishment of a DIAMETER association with the second HSS. In this case, since a DIAMETER association already exists between the first CSCF and the DIAMETER application server and a DIAMETER association already exists between the second HSS and the DIAMETER application server, there is no need to perform the messaging and processing of steps 308-314 of FIG. 3 for the first CSCF or the second HSS; rather, the DIAMETER application server merely retrieves the existing associations for the first CSCF and the second HSS (e.g., using steps 304 and 306 of FIG. 3 for each of the first CSCF and the second HSS) and links the retrieved associations for first CSCF and the second HSS.

From this example, it becomes clear that the DIAMETER association establishment according to the present invention provides improved establishment of DIAMETER associations because DIAMETER associations are established between the physical nodes and the DIAMETER application server, rather than between all possible permutations of physical originating nodes and physical destination nodes.

From this example, it becomes clear that network resources (e.g., network transmission, processing, and like resources) that would otherwise be consumed in order to establish an association between physical nodes (i.e., when the present invention is not implemented) do not need to be consumed in order to establish an association between physical nodes (i.e., when the present invention is implemented).

Furthermore, as described herein, the DIAMETER association establishment method of the present invention enables the DIAMETER application server to perform load balancing of DIAMETER signaling messages. A method for performing load balancing of DIAMETER signaling messages is depicted and described with respect to FIG. 4.

Figure 4:
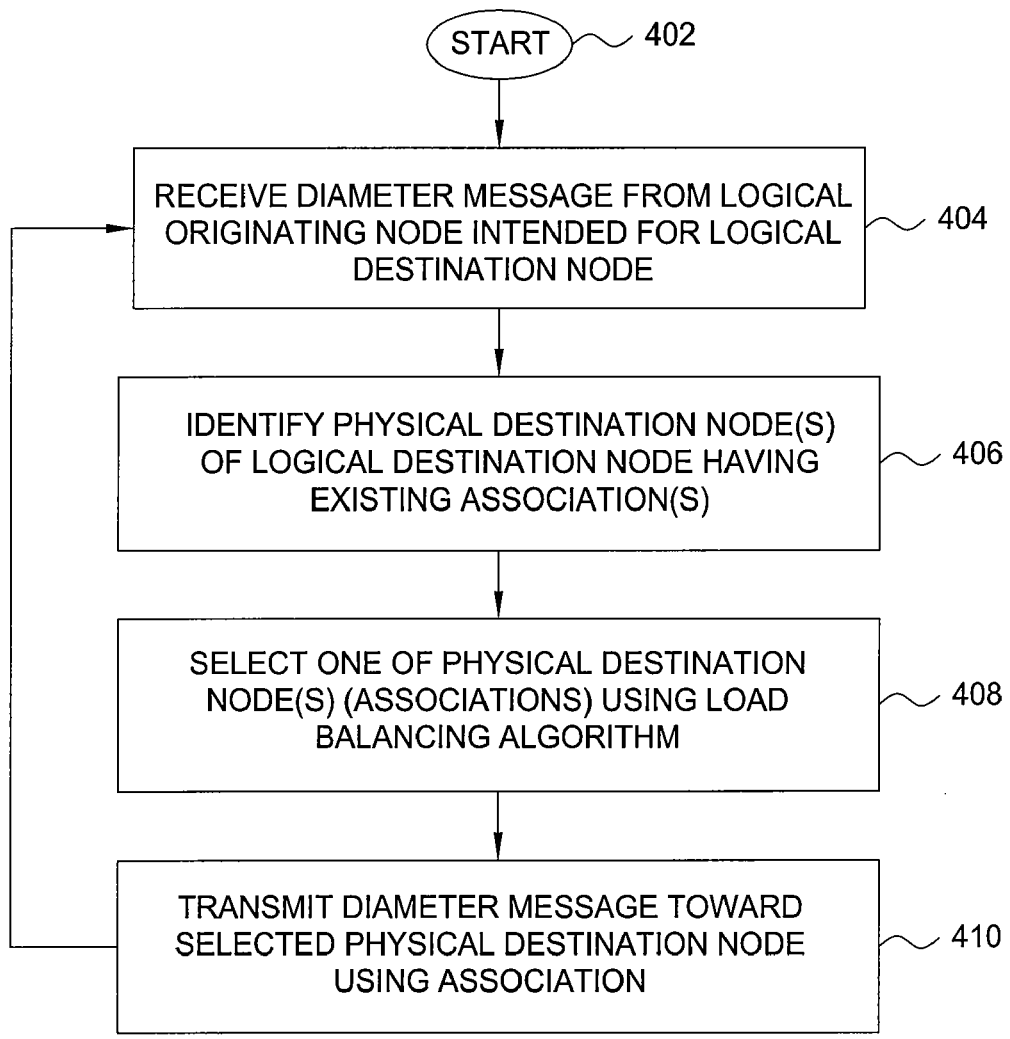
FIG. 4 depicts a method according to one embodiment of the present invention.

FIG. 4 depicts a method according to one embodiment of the present invention. Specifically, method 400 of FIG. 4 includes a method for switching DIAMETER signaling between originating nodes and destination nodes (i.e., for selecting one of a plurality of physical destination node of a logical destination node to receive a message destined for the logical destination node). Although depicted and described as being performed serially, at least a portion of the steps of method 400 of FIG. 4 may be performed contemporaneously, or in a different order than depicted and described with respect to FIG. 4. The method 400 begins at step 402 and proceeds to step 404.

At step 404, a DIAMETER message is received. The DIAMETER message is received from a logical originating node, which may be composed of multiple physical originating nodes. The DIAMETER message is intended for a logical destination node, which may be composed of multiple physical destination nodes. The DIAMETER message is received at a DIAMETER application server.

At step 406, physical destination nodes of the logical destination node that have existing associations with the DIAMETER application server are identified. For example, where the logical destination node is a logical HSS composed of five hundred physical HSS nodes (each of which is a physical instance of that logical HSS node that is provided for load balancing purposes, i.e., so that one physical node is not responsible for all HSS messaging in the network), anywhere from zero to five hundred of the physical HSS nodes may have existing associations with the DIAMETER application server.

At step 408, one of the physical destination nodes of the logical destination node that has an existing association with the DIAMETER application is selected. The selected one of the physical destination nodes of the logical destination node is selected as the physical destination node responsible for responding to the received DIAMETER message. The selected one of the physical destination nodes of the logical destination node may be selected using any load balancing algorithm.

In one embodiment, physical destination nodes may be selected in a round robin manner. In one embodiment, physical destination nodes may be selected in a weighted round robin manner. The selected one of the physical destination nodes of the logical destination node may be selected using various other load balancing algorithms.

At step 410, the DIAMETER message is transmitted. The DIAMETER message is transmitted from the DIAMETER application server to the selected one of the physical destination nodes of the logical destination node. The DIAMETER message is transmitted to the selected one of the physical destination nodes of the logical destination node using the existing association between the DIAMETER application server and the selected one of the physical destination nodes.

As depicted in FIG. 4, from step 410, method 400 returns to step 404. In other words, the DIAMETER application server continues receiving DIAMETER messages and transmitting DIAMETER messages in a manner for balancing the load of DIAMETER messages across physical nodes of each logical node.

Although depicted and described with respect to balancing the load of DIAMETER messages across physical destination nodes of a logical destination node, load of DIAMETER messages may also be balanced across physical originating nodes of a logical originating node. This may include balancing of DIAMETER response messages initiated from destination nodes to originating nodes (i.e., in response to DIAMETER request message initiated from originating nodes to destination nodes). This may also include balancing of DIAMETER request messages initiated from destination nodes to originating nodes (i.e., in which case destination nodes may be considered to operate as originating nodes, and originating nodes may be considered to operate as destination nodes).

Figure 5:
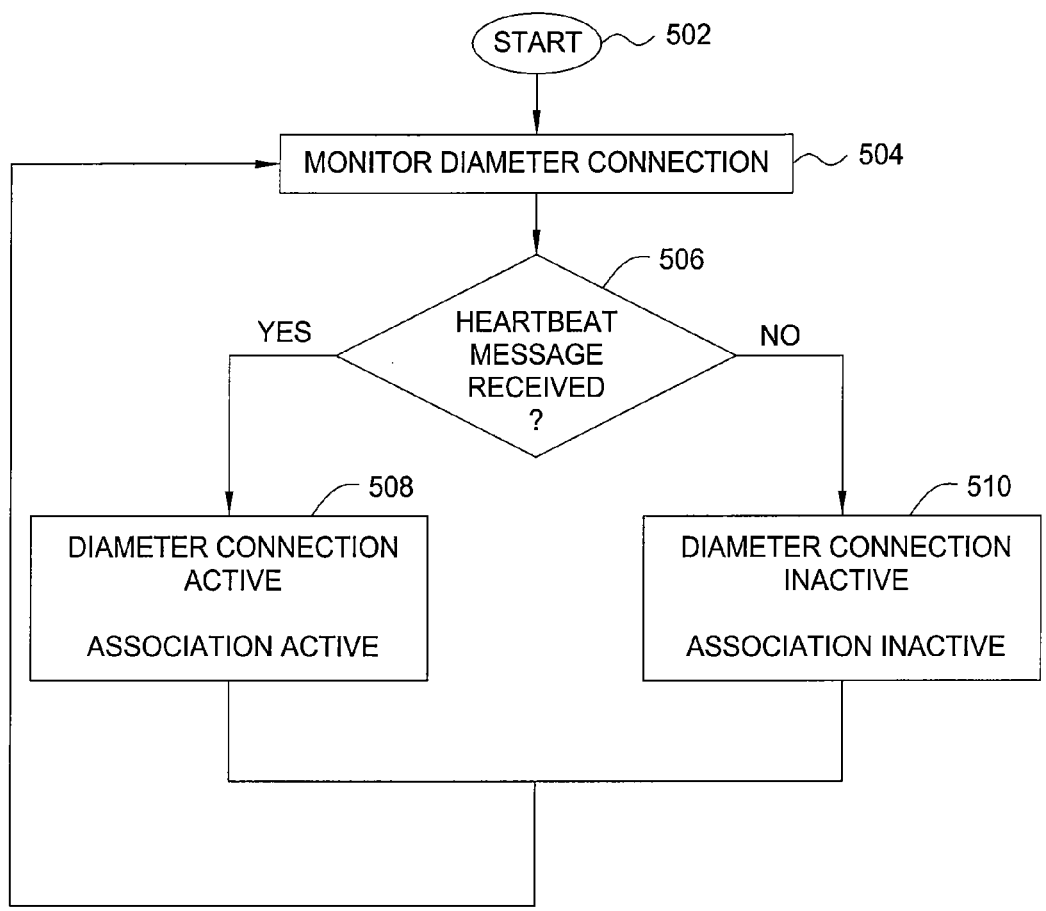
FIG. 5 depicts a method according to one embodiment of the present invention.

FIG. 5 depicts a method according to one embodiment of the present invention. Specifically, method 500 of FIG. 5 includes a method for monitoring a DIAMETER connection between a DIAMETER application server and a DIAMETER node (e.g., physical originating node or physical destination node). The method 500 of FIG. 5 may be performed by the DIAMETER application server for each DIAMETER connection between the DIAMETER application server and each DIAMETER node. Although depicted and described as being performed serially, at least a portion of the steps of method 500 of FIG. 5 may be performed contemporaneously, in a different order than depicted and described with respect to FIG. 5. The method 500 begins at step 502 and proceeds to step 504.

At step 504, a DIAMETER connection is monitored. The DIAMETER connection is a connection between the DIAMETER application server and the physical node. In one embodiment, the DIAMETER application server monitors the DIAMETER connection for a heartbeat message. At step 506, a determination is made as to whether a heartbeat message is received from the physical node.

Since heartbeats are expected to be received periodically, the determination as to whether a heartbeat message is received from the physical node is a determination as to whether a heartbeat message has been received within certain period of time (e.g., within a threshold period of time since the previous heartbeat message was received, by a particular time determined according to the periodicity with which heartbeat messages are expected to be transmitted, and the like).

If a heartbeat message is received, the connection between the DIAMETER application server and the physical node is active (step 508) and, thus, the association between the DIAMETER application server and the physical node remains active. From step 508, method 500 returns to step 504 (i.e., the DIAMETER application server continues monitoring the health of the DIAMETER connection for that physical node in order to ensure that the DIAMETER connection remains active).

If a heartbeat message is not received, the connection between the DIAMETER application server and the physical node is inactive (step 510) and, thus, the association between the DIAMETER application server and the physical node switches from being active to being inactive. From step 510, method 500 returns to step 504 (i.e., the DIAMETER application server continues monitoring the health of the DIAMETER connection for that physical node in order to detect when the DIAMETER connection becomes active again).

As described with respect to FIG. 5, an association between the DIAMETER application server and the physical node may be active or inactive depending on whether the associated DIAMETER connection between the DIAMETER application server and the physical node is active or inactive. The status of an association may be tracked in a number of different ways.

In one embodiment, the status of the existing associations may be tracked using a status parameter for each association (e.g., which may be stored as part of the information stored for each association). For example, the status parameter for an association may be set to ACTIVE or INACTIVE based on the health of the DIAMETER connection.

In one embodiment, the status of the existing associations may be tracked by maintaining a list of active associations and a list of inactive associations. For example, an association may be switched between the active list and the inactive list based on the health of the DIAMETER connection.

Although primarily depicted and described with respect to a single logical originating node (illustratively, logical originating node 112) deployed using multiple physical instances (illustratively, physical originating nodes 110) and a single logical destination node (illustratively, logical destination node 122) deployed using multiple physical instances (illustratively, physical destination nodes 120), many networks may include multiple logical originating nodes (some or all of which are implemented as multiple physical instances) and/or multiple logical destination nodes (some or all of which are implemented as multiple physical instances). For example, in an IMS network, one or more of the CSCF(s), HSS(s), AS(s), and the like, may be deployed using any combination of logical/physical nodes. An example of such a network is depicted and described with respect to FIG. 6.

Figure 6:
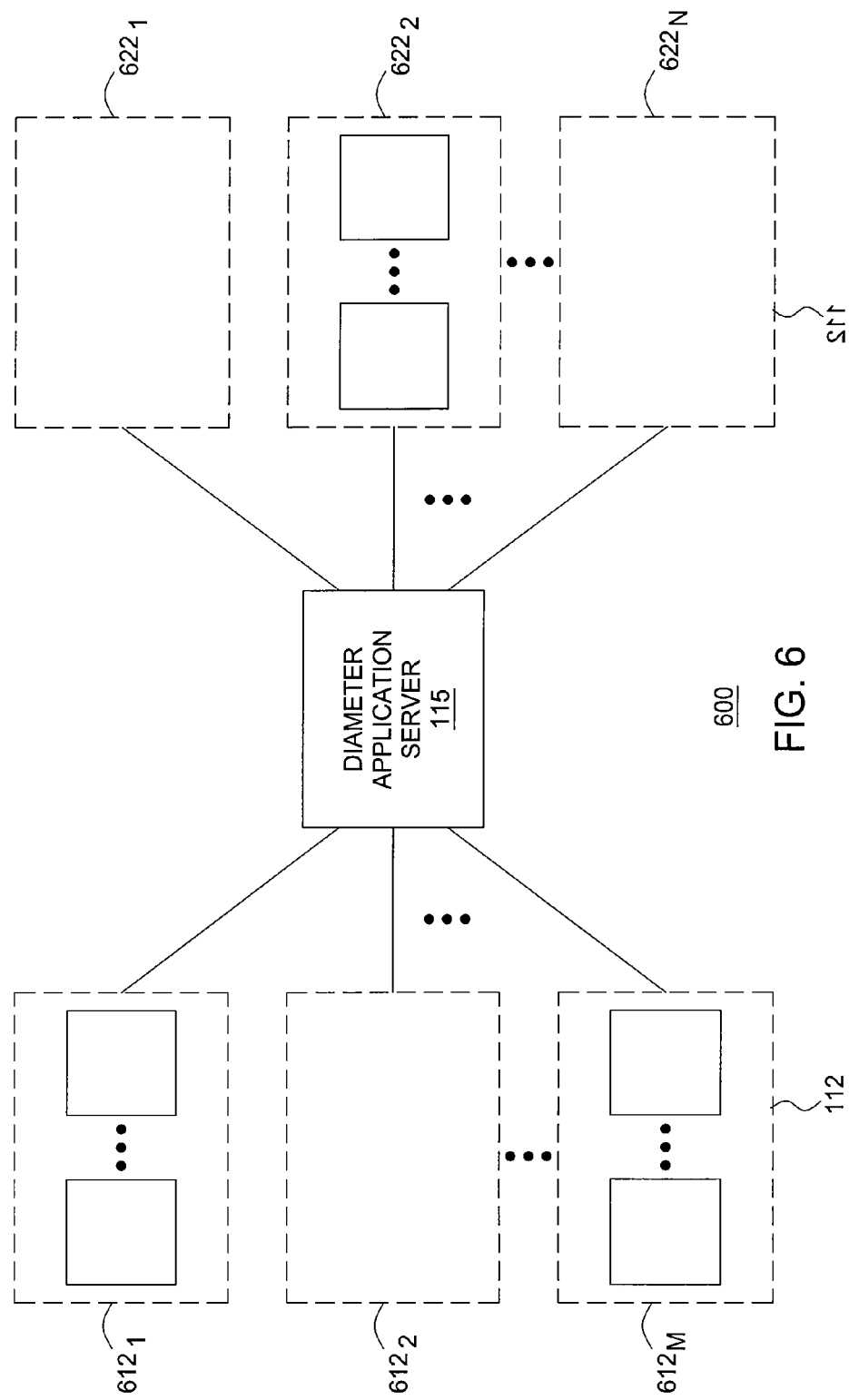
FIG. 6 depicts a communication network including multiple logical originating nodes and multiple logical destination nodes.

FIG. 6 depicts a communication network including multiple logical originating nodes and multiple logical destination nodes. Specifically, communication network 600 includes a DIAMETER Application Server (DAS) 115 facilitating DIAMETER-based communications between a plurality of logical originating nodes $612_1$-$612_M$ (collectively, logical originating nodes 612) and a plurality of logical destination nodes $622_1$-$622_N$ (collectively, logical destination nodes 622).

As depicted in FIG. 6, each of one or more of the logical originating nodes 612 may be implemented using multiple physical instances (i.e., using multiple physical originating nodes) and each of one or more of the logical destination nodes 622 may be implemented using multiple physical instances (i.e., using multiple physical destination nodes).

Thus, at least from communication network 600 of FIG. 6, it is clear that the DIAMETER signaling management functions of the present invention (e.g., DIAMETER association establishment functions, DIAMETER traffic load balancing functions, and the like) may be applied to DIAMETER signaling networks (or other non-DIAMETER signaling networks) including one or more logical originating nodes and one or more logical destination nodes.

Figure 7:
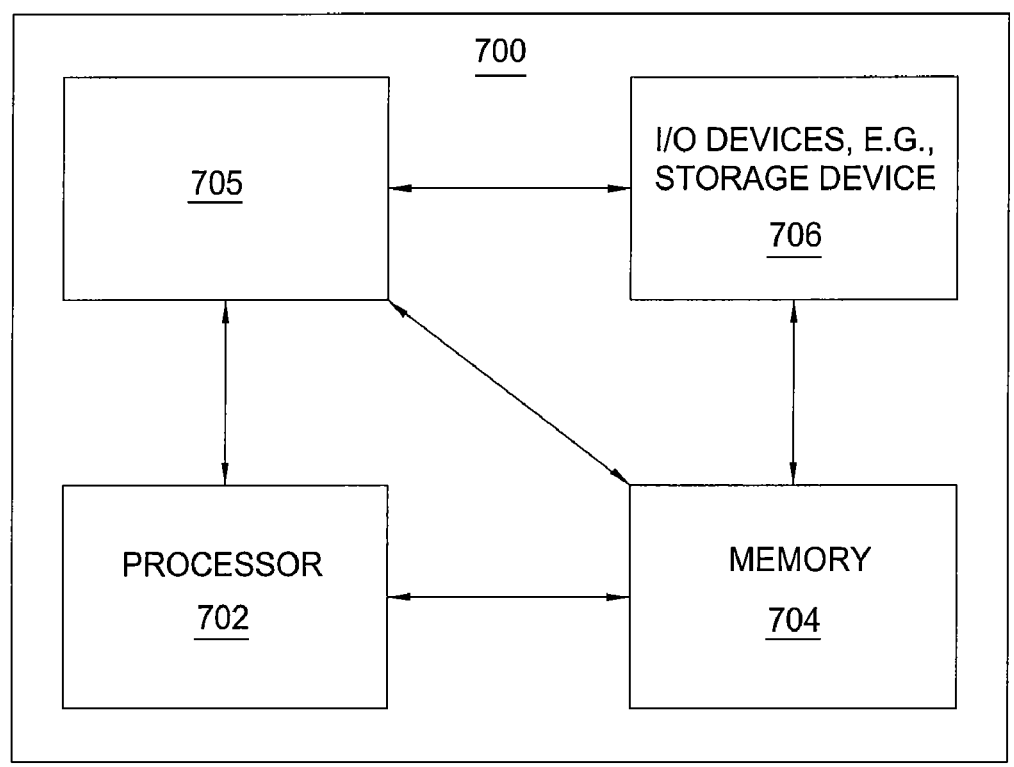
FIG. 7 depicts a high-level block diagram of a general-purpose computer suitable for use in performing the functions described herein.

FIG. 7 depicts a high-level block diagram of a general-purpose computer suitable for use in performing the functions described herein. As depicted in FIG. 7, system 700 comprises a processor element 702 (e.g., a CPU), a memory 704, e.g., random access memory (RAM) and/or read only memory (ROM), a DIAMETER application server module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present DIAMETER application server process 705 can be loaded into memory 704 and executed by processor 702 to implement the functions as discussed above. As such, DIAMETER application server process 705 (including associated data structures) of the present invention can be stored on a computer readable medium or carrier, e.g., RAM memory, magnetic or optical drive or diskette, and the like.

Although various embodiments which incorporate the teachings of the present invention have been shown and described in detail herein, those skilled in the art can readily devise many other varied embodiments that still incorporate these teachings.

What is claimed is:

1. A method for establishing DIAMETER associations between nodes of a network using a DIAMETER application server, comprising:

receiving, at the DIAMETER application server from an originating node, a DIAMETER connection establishment request configured to request establishment of a DIAMETER association between the originating node and a destination node for supporting propagation of DIAMETER signaling messages from the originating node toward the destination node;

terminating the DIAMETER connection establishment request at the DIAMETER application server;

obtaining, at the DIAMETER application server, a first DIAMETER association between the originating node and the DIAMETER application server;

obtaining, at the DIAMETER application server, a second DIAMETER association between the destination node and the DIAMETER application server;

linking the obtained first and second DIAMETER associations at the DIAMETER application server, the linked first and second DIAMETER associations configured to support propagation of DIAMETER signaling messages from the originating node toward the destination node; and storing the linked first and second DIAMETER associations at the DIAMETER application server.

2. The method of claim 1, wherein obtaining a DIAMETER association for a node comprises:

identifying a node associated with the DIAMETER connection establishment request;

determining if a DIAMETER association exists for the identified node;

if a DIAMETER association exists for the identified node, retrieving the DIAMETER association from memory;

if a DIAMETER association does not exist for the identified node, establishing the DIAMETER association by:
 initiating a DIAMETER association request message toward the node;
 receiving a DIAMETER association response message from the node;
 generating the DIAMETER association in response to the DIAMETER association response message; and
 storing the DIAMETER association.

3. The method of claim 1, further comprising:
receiving, at the DIAMETER application server, a DIAMETER signaling message from the originating node, wherein the DIAMETER signaling message is intended for a logical destination node comprising a plurality of physical destination nodes;
identifying the logical destination node for which the DIAMETER signaling message is intended;
identifying ones of the physical destination nodes having existing DIAMETER associations with the DIAMETER application server;
selecting one of the identified ones of the physical destination nodes using load balancing; and
propagating the DIAMETER signaling message from the DIAMETER application server toward the selected one of the physical destination nodes using the DIAMETER association of the selected one of the physical destination nodes.

4. The method of claim 1, further comprising:
monitoring for a heartbeat message from one of the nodes.

5. The method of claim 4, further comprising:
in response to a determination that a heartbeat message is not received from the monitored one of the nodes after a threshold period of time, deactivating a DIAMETER association for the monitored one of the nodes.

6. The method of claim 4, further comprising:
in response to a determination that a heartbeat message is received from the monitored one of the nodes for which a DIAMETER association is currently deactivated, activating the DIAMETER association for the monitored one of the nodes.

7. The method of claim 1, wherein the originating node comprises one of a plurality of physical nodes of a logical network entity and the destination node comprises one of a plurality of physical nodes of a logical network entity.

8. An apparatus for establishing DIAMETER associations between nodes of a network using a DIAMETER application server, comprising:

a processor and a memory, the processor configured to:
 receive, at the DIAMETER application server from an originating node, a DIAMETER connection establishment request configured to request establishment of a DIAMETER association between the originating node and a destination node for supporting propagation of DIAMETER signaling messages from the originating node toward the destination node;
 terminate the DIAMETER connection establishment request at the DIAMETER application server;
 obtain, at the DIAMETER application server, a first DIAMETER association between the originating node and the DIAMETER application server;
 obtain, at the DIAMETER application server, a second DIAMETER association between the destination node and the DIAMETER application server;
 link the obtained first and second DIAMETER associations at the DIAMETER application server, the linked first and second DIAMETER associations configured to support propagation of DIAMETER signaling messages from the originating node toward the destination node; and
 store the linked first and second DIAMETER associations at the DIAMETER application server.

9. The apparatus of claim 8, wherein, to obtain a DIAMETER association for a node, the processor is configured to:
identify a node associated with the DIAMETER connection establishment request;
determine if a DIAMETER association exists for the identified node;
retrieve the DIAMETER association from memory if a DIAMETER association exists for the identified node; and
if a DIAMETER association does not exist for the identified node, establish the DIAMETER association by:
 initiating a DIAMETER association request message toward the node;

receiving a DIAMETER association response message from the node;
generating the DIAMETER association in response to the DIAMETER association response message; and
storing the DIAMETER association.

10. The apparatus of claim 8, wherein the processor is further configured to:
receive, at the DIAMETER application server, a DIAMETER signaling message from the originating node, wherein the DIAMETER signaling message is intended for a logical destination node comprising a plurality of physical destination nodes;
identify the logical destination node for which the DIAMETER signaling message is intended;
identify ones of the physical destination nodes having existing DIAMETER associations with the DIAMETER application server;
select one of the identified ones of the physical destination nodes using load balancing; and
propagate the DIAMETER signaling message from the DIAMETER application server toward the selected one of the physical destination nodes using the DIAMETER association of the selected one of the physical destination nodes.

11. The apparatus of claim 8, wherein the processor is further configured to:
monitor for a heartbeat message from one of the nodes.

12. The apparatus of claim 11, wherein the processor is further configured to: deactivate a DIAMETER association for the monitored one of the nodes in response to a determination that a heartbeat message is not received from the monitored one of the nodes after a threshold period of time.

13. The apparatus of claim 11, wherein the processor is further configured to:
activate a DIAMETER association for the monitored one of the nodes in response to a determination that a heartbeat message is received from the monitored one of the nodes for which the DIAMETER association is currently deactivated.

14. The apparatus of claim 8, wherein the originating node comprises one of a plurality of physical nodes of a logical network entity and the destination node comprises one of a plurality of physical nodes of a logical network entity.

15. A method, comprising: receiving a DIAMETER signaling message at a DIAMETER application server, wherein the DIAMETER signaling message is received from a logical originating node comprising a physical originating node, wherein the DIAMETER signaling message is received via a first DIAMETER association between the physical originating node and the DIAMETER application server, wherein the DIAMETER signaling message is intended for a logical destination node comprising a plurality of physical destination nodes;
identifying the logical destination node;
identifying ones of the physical destination nodes having respective existing DIAMETER associations with the DIAMETER application server that are linked to the first DIAMETER association at the DIAMETER application server to support propagation of DIAMETER signaling messages from the physical originating node toward the physical destination nodes;
selecting one of the identified ones of the physical destination nodes using a load balancing algorithm; and
propagating the DIAMETER signaling message toward the selected one of the physical destination nodes using the existing DIAMETER association between the DIAMETER application server and the selected one of the physical destination nodes.

16. The method of claim 15, wherein the existing DIAMETER association between the DIAMETER application server and the selected one of the physical destination nodes is established by a method comprising:
receiving a DIAMETER connection establishment request from at least one physical originating node requesting a DIAMETER association with the physical destination node;
terminating the DIAMETER connection establishment request; and
in response to a determination that the DIAMETER association with the physical destination node does not exist, establishing the DIAMETER association with the physical destination node.

17. The method of claim 16, wherein establishing the DIAMETER association with the physical destination node comprises:
initiating a DIAMETER association request message toward the physical destination node;
receiving a DIAMETER association response message from the physical destination node;
generating the DIAMETER association in response to the DIAMETER association response message; and
storing the DIAMETER association for the physical destination node.

18. An apparatus, comprising:
a processor and a memory, the processor configured to:
receive a DIAMETER signaling message at a DIAMETER application server, wherein the DIAMETER signaling message is received from a logical originating node comprising a physical originating node, wherein the DIAMETER signaling message is received via a first DIAMETER association between the physical originating node and the DIAMETER application server, wherein the DIAMETER signaling message is intended for a logical destination node comprising a plurality of physical destination nodes;
identify the logical destination node;
identify ones of the physical destination nodes having respective existing DIAMETER associations with the DIAMETER application server that are linked to the first DIAMETER association at the DIAMETER application server to support propagation of DIAMETER signaling messages from the physical originating node toward the physical destination nodes;
select one of the identified ones of the physical destination nodes using a load balancing algorithm; and
propagate the DIAMETER signaling message toward the selected one of the physical destination nodes using the existing DIAMETER association between the DIAMETER application server and the selected one of the physical destination nodes.

19. The apparatus of claim 18, wherein, for establishing the existing DIAMETER association between the DIAMETER application server and the selected one of the physical destination nodes, the processor is further configured to:
receive a DIAMETER connection establishment request from at least one physical originating node requesting a DIAMETER association with the physical destination node;
terminate the DIAMETER connection establishment request; and establish the DIAMETER association with the physical destination node in response to a determination that the DIAMETER association with the physical destination node does not exist.

20. The apparatus of claim 19, wherein, for establishing the DIAMETER association with the physical destination node, the processor is further configured to:

initiate a DIAMETER association request message toward the physical destination node;

receive a DIAMETER association response message from the physical destination node;

generate the DIAMETER association in response to the DIAMETER association response message; and store the DIAMETER association for the physical destination node.

\* \* \* \* \*